No. 705,108. Patented July 22, 1902.
O. MARTH.
SPEED CHANGING FRICTION GEARING.
(Application filed Jan. 2, 1902.)

(No Model.)

Witnesses.

Inventor.
Oscar Marth,
per Knight Bros
Attorneys.

UNITED STATES PATENT OFFICE.

OSCAR MARTH, OF ALSO LIESZKO, AUSTRIA-HUNGARY.

SPEED-CHANGING FRICTION-GEARING.

SPECIFICATION forming part of Letters Patent No. 705,108, dated July 22, 1902.

Application filed January 2, 1902. Serial No. 88,094. (No model.)

*To all whom it may concern:*

Be it known that I, OSCAR MARTH, a subject of the Emperor of Germany, residing at Also Lieszko, in the county of Trencsin and Empire of Austria-Hungary, have invented new and useful Improvements in Speed-Changing Friction-Gearing, of which the following is a specification.

My invention relates to that class of gearing in which one of two shafts arranged in line with each other carries an annular friction-wheel and the other an ordinary friction-wheel of smaller diameter, motion being transmitted by means of intermediate rollers adapted to engage both friction-wheels.

The invention has for its purpose to provide a friction-gearing of this class which can be thrown into and out of gear at will and in which so much friction can be created that it is adapted for the transmission of considerable amounts of power.

According to my invention the annular friction-wheel and disk-shaped friction-wheel are arranged in different planes, and the intermediate rollers, which are journaled in a frame axially movable along the shafts, are elongated and provided with conical ends, while in the ends of the two shafts there is journaled a globular roller, against which the said conical ends lean when the gearing is engaged.

Figure 1:
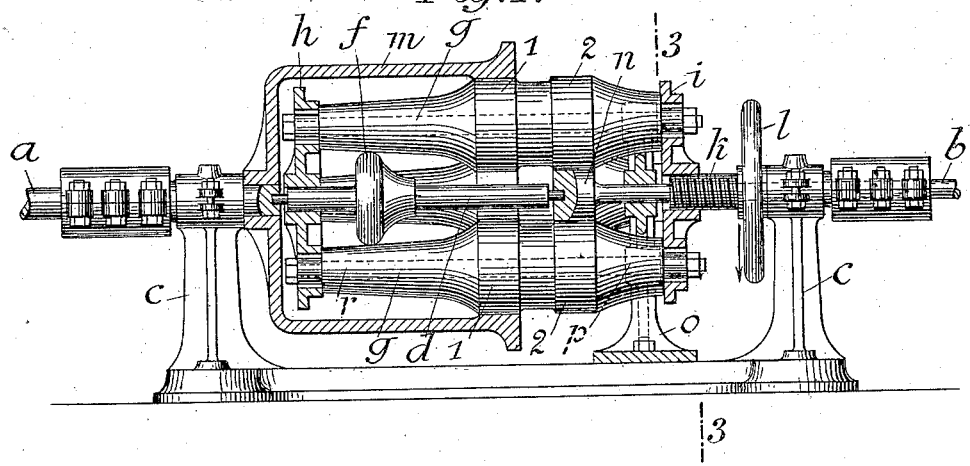
Figure 2:
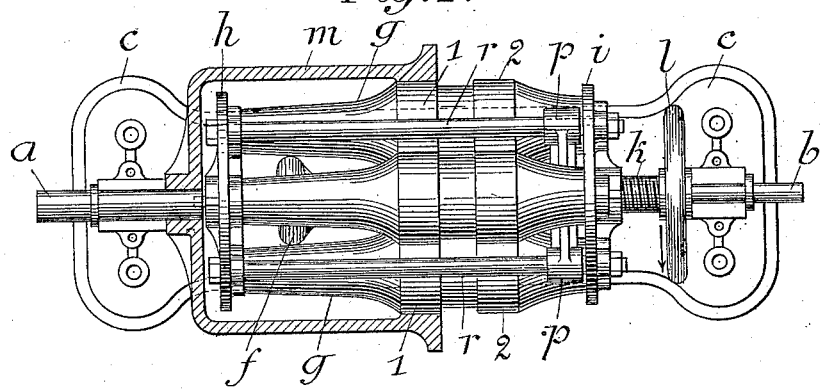
Figure 3:
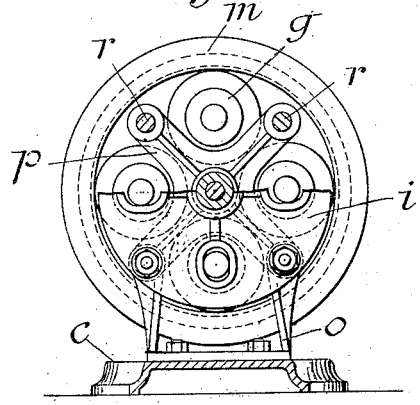

In the annexed sheet of drawings, Figure 1 is a sectional side elevation of my improved friction-gearing. Fig. 2 is a cross-section of Fig. 1, and Fig. 3 is a partly-sectional end view of the gearing.

Referring to the drawings, $a$ and $b$ are the shafts, in line with each other and from one of which motion is to be transmitted to the other in such a manner that the shaft $a$ revolves in a given ratio more slowly than the shaft $b$. The shafts $a$ and $b$ have their bearings formed in the standards $c$, carried by a common bed-plate, and in the ends of the said shafts are formed the bearings of a shaft $d$, which carries a globular or spheroidal roller $f$. The said spheroidal roller $f$ is intended to force asunder the conical ends of a number of elongated rollers $g$, the trunnions of which are journaled in slots of two shields $h$ and $i$. The shield $h$ is loosely mounted upon the shaft $d$, and the shield $i$ has its threaded central hole engaged by a tubular screw $k$, loosely mounted upon the shaft $b$ and carrying a hand-wheel $l$. The standard $o$, which is secured to the bed-plate between the shields $h$ and $i$, is made integral with a cross-shaped shield $p$, through the eyes of which pass rods $r$, which connect the two shields $h$ and $i$ with each other. It will be seen that thus the frame formed by the two shields $h$ and $i$ and the rods $r$ is adapted to be moved endwise, but prevented from being rotated around the shafts $b$ and $d$.

When the aforesaid hand-wheel $l$ is rotated in the direction of the arrow, the frame in which the rollers $g$ are journaled is pushed toward the shaft $a$, and thereby the conical ends of the elongated rollers $g$ are caused to slide upon the spheroidal roller $f$ with a wedging effect and are forced asunder with considerable force. At the same time the cylindric working surfaces 1 of the rollers $g$ are caused to enter the annular friction-wheel $m$, keyed to the shaft $a$, and other cylindric working surfaces 2 of the said rollers are brought into contact with the circumference of the disk-shaped friction-wheel $n$, keyed to the shaft $b$. As the annular friction-wheel $m$ and the solid friction-wheel $n$ are arranged a certain distance apart and as the spheroidal roller $f$, too, is placed at a given distance from the said two wheels, considerable leverage takes place when the conical ends of the transmitting-rollers $g$ are forced upon the spheroidal roller $f$. The cylindric working surfaces 1 and 2 of the intermediate rollers $g$ fit snugly into the annular wheel $m$ and around the disk-shaped wheel $n$, respectively, and in consequence of the explained leverage they are pressed with considerable force against the friction-wheels. The considerable amount of friction thus created enables this clutch to transmit great amounts of power.

It will be readily understood that instead of endwise-movable intermediate rollers $g$ and a spheroidal roller $f$, secured against endwise displacement, the reverse arrangement may be used—that is to say, rollers $g$, journaled in a fixed frame, and a spheroidal roller $f$, adapted to be moved endwise for being engaged with or disengaged from the conical ends of the rollers $g$. This latter arrangement may be used to advantage in the case of one of the two shafts $a$ and $b$ being rather short, when this short shaft is made tubular and has passing through it a screw for operating the spheroidal roller $f$.

What I claim, and desire to secure by Letters Patent of the United States, is—

1. In a speed-changing friction-gearing, the combination with the two shafts, arranged in a line, of an annular friction-wheel secured to the shaft which is to revolve slower, a solid friction-wheel, secured to the other shaft and located outside the plane of the annular wheel, a spheroidal roller journaled in the ends of the two shafts, a frame loosely surrounding the shafts, means for preventing the said frame from turning around the shafts, and a number of elongated rollers journaled in radial slots of the said frame, one of the two parts—frame or spheroidal roller—being endwise movable, and each of the rollers journaled in the frame having two cylindric working surfaces adapted to engage the annular and ordinary friction-wheels and a conical end adapted to engage the spheroidal roller, substantially as and for the purpose described.

2. In a speed-changing friction-gearing, the combination with the two shafts, arranged in line, of an annular friction-wheel secured to one shaft, a disk-shaped friction-wheel, secured to the other shaft, without the plane of the annular wheel, a spheroidal roller journaled in the ends of the two shafts, a frame in the shape of a lantern-wheel loosely mounted to the line of shafting and adapted to move endwise, means for preventing said frame from revolving, a tubular screw loosely mounted upon the shaft carrying the solid friction-wheel and engaging a tapped hole of the lantern-wheel-shaped frame, means for turning this screw in either direction, and a number of elongated rollers journaled in radial slots of the said frame, each roller having two cylindric working surfaces adapted to engage the annular and disk-shaped friction-wheels, and having a conical end adapted to engage the spheroidal roller, substantially as and for the purpose described.

In witness whereof I have signed this specification in presence of two witnesses.

OSCAR MARTH.

Witnesses:
VICTOR KEUPL,
ALVESTO S. HOGUE.